(12) United States Patent
Srinivansan et al.

(10) Patent No.: US 8,032,666 B2
(45) Date of Patent: Oct. 4, 2011

(54) LOCATION ENABLED BOOKMARK AND PROFILE

(75) Inventors: Sridhar Srinivansan, Shanghai (CN); Ye Gu, Shanghai (CN); Johnny Liu, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 188 days.

(21) Appl. No.: 12/483,909

(22) Filed: Jun. 12, 2009

(65) Prior Publication Data

US 2010/0318701 A1 Dec. 16, 2010

(51) Int. Cl.
G06F 3/00 (2006.01)
G06F 13/12 (2006.01)
G06D 1/00 (2006.01)
G06C 21/00 (2006.01)

(52) U.S. Cl. ........... 710/15; 710/16; 710/17; 710/18; 710/19; 710/72; 701/1; 701/200

(58) Field of Classification Search ........... None
See application file for complete search history.

(56) References Cited

U.S. PATENT DOCUMENTS

| 6,308,273 | B1 | 10/2001 | Goertzel |
| 6,731,612 | B1 | 5/2004 | Koss |
| 6,972,698 | B2 | 12/2005 | Deguchi |
| 7,289,812 | B1 | 10/2007 | Roberts |
| 2002/0035609 | A1 | 3/2002 | Lessard |
| 2008/0133336 | A1* | 6/2008 | Altman et al. ........... 705/10 |
| 2008/0177858 | A1 | 7/2008 | Aarnio |

OTHER PUBLICATIONS

Shijun Yu, et al., "User Profiles in Location-based Services: Make Humans More Nomadic and Personalised," Oct. 2003, 3 pp.; http://lbdwww.epfl.ch/e/publications_new/articles.pdf/NG2103.pdf.

Niels Henze, et al., "Personalization and User Profile Management," Nov. 2008, 4 pp.; http://portal.etsi.org/docbox/Workshop/2008/200811_MULTIMODALINTERACTION/STF342_PETERSEN_PersonalizationProfiles_Multimodal_V03%20%5BCompatibility%20Mode%5D.pdf.

Francoise Petersen, "Contextual Bookmarks," 2007, 32 pp. http://infoscience.epfl.ch/record/116212/files/MIRW07_Contextual_Bookmark.pdf.

* cited by examiner

Primary Examiner — Alan Chen
(74) Attorney, Agent, or Firm — Shook, Hardy & Bacon L.L.P.

(57) ABSTRACT

Location based profiles are used to modify the configuration of a computing device based on a detected location. The location based profiles allow features such as cameras to be enabled and disabled. Physical and logical data storage partitions can also be mounted and unmounted, and the home screen displayed by a device can be modified. Location bookmarks can be used to further customize the appearance and function of a computing device.

20 Claims, 5 Drawing Sheets

LOCATION ENABLED BOOKMARK AND PROFILE

BACKGROUND

Personal computing devices now come in a variety of shapes and sizes, and can provide widely varying functions. As processing power increases relative to chip size, the distinctions are blurring between a laptop computers, cell phones, and other handheld or portable computing devices. The functionality available in a given device is also improving, with features such as cameras, global positioning system (GPS) capabilities, and wireless internet access capabilities becoming increasingly common. This has allowed for productivity gains, as users can access information using portable devices from widely varying locations.

SUMMARY

In various embodiments, systems and methods are provided for enabling location based profiles and bookmarks on a computing device that includes GPS capabilities. Location based profiles allow a device to be customized so that the device can display a different desktop, have different features, and/or have access to different disk or memory partitions depending on the device location. For example, a device can be configured to have a business orientation when an employee is present on a work site. This could include disabling the camera and/or video camera features of the computing device, enabling access to secure portions of the company intranet, enabling access to a secure drive partition on the device, providing a desktop with links to commonly used applications, or other changes. When the user leaves the vicinity of the company site, as defined by a GPS boundary stored on the device, the camera can be activated while the access to a confidential data partition is disabled. Additional features or applications can also be made available, such as a music player feature. The operation of the device can be further refined by using location based bookmarks to make additional applications or data accessible to a user at specific locations within a GPS profile area.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

Overview

Figure 1:
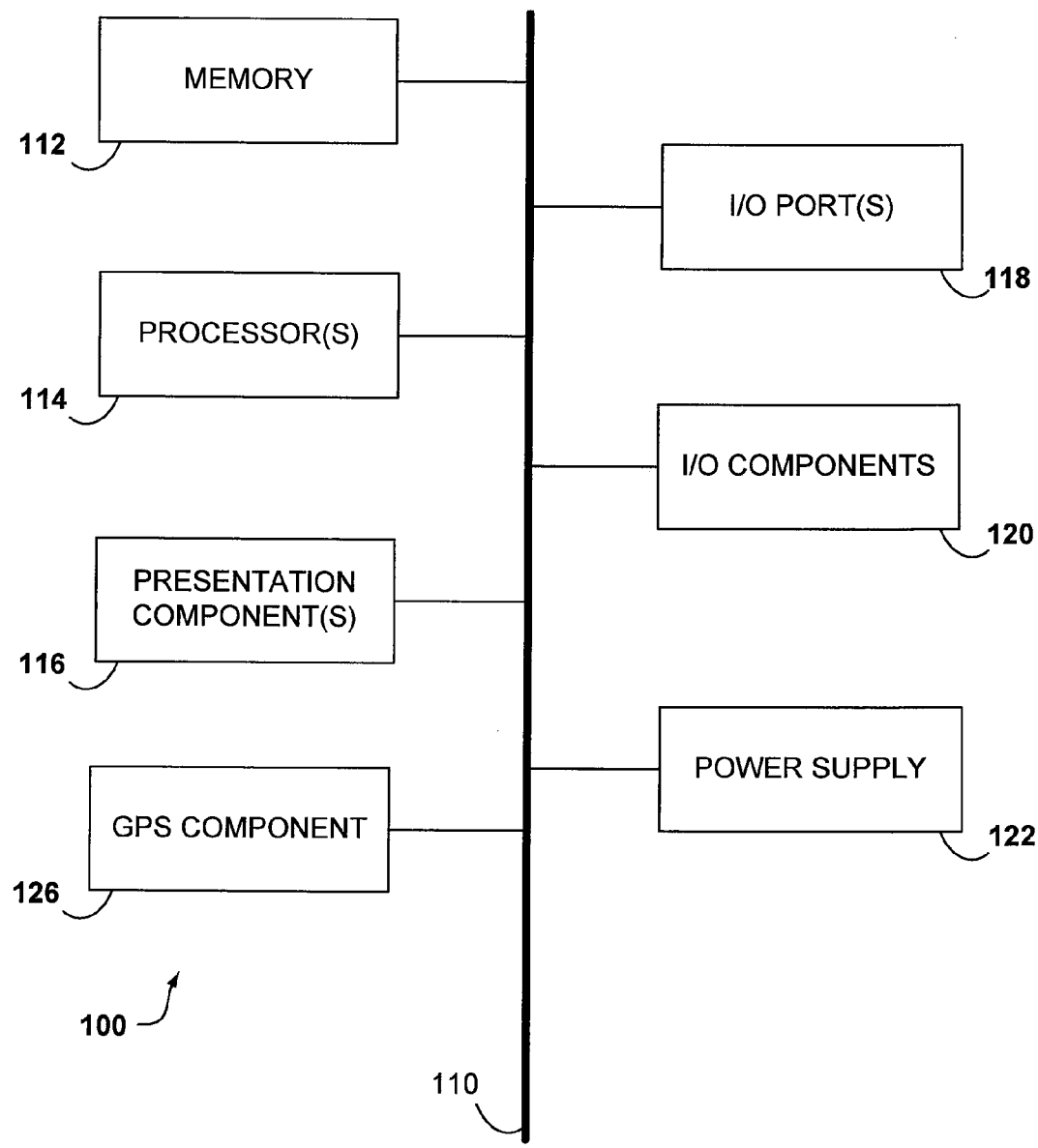
FIG. 1 is a block diagram of an exemplary computing environment suitable for use in implementing embodiments of the present invention.

Personal computing devices have an increasing number of capabilities, allowing for increasing amounts of work to be performed at locations remote from the primary work site. However, for individual users, this increase in capabilities can lead to a proliferation of devices. For example, is not uncommon for a person to have a laptop computer and a device for primarily checking e-mail issued by their company. This person may also have a personal laptop computer, a personal cell phone, and a personal music playing device, such as an MP3 player. Part of the reason for this proliferation of devices is that the devices are unaware of the distinction between a work environment and a non-work environment. Because the computing devices cannot distinguish between a work and non-work environment, a given feature will either be always available or never available on a computing device. For a risk-averse company, this means that any feature susceptible to misuse will be avoided in devices the company gives to its workers.

More generally, even for personal computing devices that include capabilities for detecting location, the device location is generally used only at a superficial level. For example, a device may allow for use of location based web browsing for identification of nearby goods and services.

In various embodiments, a system and method are provided to allow for enhanced location based behavior of computing devices. This is achieved by integrating use of location information, such as GPS information, at various levels of the operating system, so that both the user and a system administrator can use GPS information to customize the device. In particular, GPS information can be used to set up a location based profile at a higher authorization level to implement security policies that constrain device operation depending on the physical location of the device. Within the constraints put in place based on a security policy, a user can further customize the device based to have additional location based behavior.

Location Based Bookmarks

In various embodiments, an aspect of the invention is the use of location based bookmarks. A location based bookmark is a folder or similar data structure that includes location based information as part of the properties of the folder. In particular, the folder includes a description of a geographic area associated with the folder. The geographic area can be defined in any convenient manner. For example, the geographic area can be defined by a central point and a surrounding radius, by a series of boundary lines or arcs that surround an area, by a series of data points that define a boundary, or by any other convenient method that suitable defines a regular or irregular shape. Additionally, the definition of the geographic area may include the specification of one or more points within the interior of the geographic area. The bookmark can be stored on the computing device in any convenient manner. Preferably, the user will have some ability to access the bookmark regardless of the geographic location of the device.

When the computing device is within the area defined by a bookmark, the device can perform one or more actions with regard to the bookmark. For example, when the area for a bookmark is entered, a link to the bookmark can be placed on the desktop or home screen of the device. Alternatively, the bookmark can be made available in a drop down menu. Still another option is to alert the user to the fact that a location bookmark related to the current position is available.

A location based bookmark can be represented to a user as a folder or similar data structure that allows the user to add or associate content with the bookmark. For example, if the bookmark is represented as a folder, a user can drop data files, applications, or other content into the folder. Alternatively, such a user action can result in a link to the data or application being placed in the folder, or the user can be prompted as to whether the file should be moved versus having a link placed in the bookmark. A folder-type structure for the bookmark also facilitates copying or transferring a bookmark, including all of its contents, to another device. Transfer to another device can include sending the bookmark folder and its contents by e-mail. Thus, a bookmark can be placed on a device either by creating the bookmark on the device, or by receiving the bookmark from another device, such as a system administrator device or a central server. Of course, a created or received bookmark can also be subsequently modified.

Location Based Profiles

In some embodiments of the invention, various aspects of a computing device, including the desktop or home screen of the device, are configurable based on location based data. In order to facilitate this, configuration information can be stored on the computing device in a specialized folder or data structure that the computing device recognizes as a location profile folder or data structure. A location profile folder includes a geographic area designation similar to a bookmark. In addition to including various types of data like a bookmark, the profile folder can include information specific to the operation of the computing device. The computing device can have as many different location profile folders (or other profile data structures) as is convenient. Location profiles can also be created on a device, or received from another device.

One type of information that can be contained in the profile is information about the status of one or more input or output features. The term input/output features is used generally to refer to various input or output capabilities for the computing device. An input/output feature can be an individual input/output component, such as a camera, a video camera, a microphone, a wi-fi antenna, a motion sensor (such as an accelerometer or a gyroscope), or any other input or output component. An input/output feature can also include a combination of one or more input or output components and one or more applications on the device which in effect define a logical input/output feature. An example of this could be the telephone functionality of a device. In order to behave as a telephone, a device will typically need to have access to a keypad for entry of a phone number, a microphone and a speaker, an antenna for receiving data transmissions, and possibly a display screen, as well as any software necessary to coordinate the data flows during phone operation. A user may want to disable the telephone functionality, while still allowing use of some or all of the individual input/output components. Allowing the phone feature to be disabled as an input/output feature allows for this selection. Preferably, when a user disables an individual input/output component necessary for a input/output feature like a phone, the phone is also automatically disabled. Other logical features that may involve multiple components include features such as paging and text messaging.

The profile information can be used to enable or disable the operation of any or all of the input/output features. When an input feature is disabled based on a location profile, input data from the feature cannot be accessed by the user or the computing device. Similarly, when an output feature is disabled, the feature cannot be accessed for the purpose of generating the corresponding output. In some embodiments, not all input or output features of a computing device need to be included in a profile. For example, the keyboard and the display screen components of a computing device could be always on independent of the device location. Similarly, while both the GPS function and the primary display screen of a computing device could be defined as input/output features, preferably neither of these features would be deactivated based on a profile. Note also that it may be possible to disable just a portion of the functionality of an input/output feature. For example, the "touch screen" input capability of a display could be disabled while still enabling the display to show information.

Another type of information that can be included in a profile is information about whether a given content source should be accessible or inaccessible. A content source generally refers to a disk drive, drive partition, memory, memory partition, or other physical or logical data storage structure that can be used for file storage on the computing device. One example of how to make a content source accessible/inaccessible is by mounting or mounting a content source. In the discussion below, an unmounted content source refers to a content source that is available in terms of connectivity (either by co-location or by network), but that is not available for access. As an example, a computing device can be configured to mount (and thus make available) all drive partitions and other content sources as a default. Each profile could then specify any content sources that should be unmounted in the geographic area corresponding to the profile. When the computing device crosses the boundary for a geographic area corresponding to a profile, any drives or content sources specified in the profile are unmounted. Additionally, any unmounted drives not specified in the profile are mounted to allow access.

In another example, a content source can be made accessible or inaccessible using encryption. In such an example, the information in a content source can be encrypted. In order to access the data, an application, operating system, or other program uses a decryption key. When the content source is accessible, the decryption key can be available, such as by being provided in a specified location on the computing device. When the content source is inaccessible, the decryption key can be removed from the specified location. A different decryption key can be required for each content source, which allows access to the content sources to be independently controlled. Other examples of methods to allow or deny access to a content source according to an embodiment of the invention will be apparent to those of skill in the art.

In various embodiments described below, content sources will be described as being mounted or unmounted. Mounting and unmounting will be used to simplify the language of the examples. Those of skill in the art will recognize that any other methods of making a content source accessible or not accessible can be substituted for the mounting and unmounting examples described below.

Still another type of information that can be included in the profile is information about the desktop or home screen that should be displayed. This can include a listing of any files that should be placed on the home screen and/or have links on the home screen, as well as any other information related to displaying the customized desktop or home screen. A home screen refers to the default or starting view displayed by a computing device. The desktop on a laptop computer is one example of a home screen. The first screen displayed that allows for user input on a handheld device such as a cell phone is also an example of a home screen. The home screen information in a profile can include, for example, the background to be displayed, the applications or files that should be accessible directly from the desktop, and any additional information that should be displayed on the desktop such as the current time, the number of pending e-mails, etc. When a geographic boundary for a location profile is crossed, the home screen for the computing device can be modified to match the information in the profile. In some embodiments, the profile can specify that only one application will be used in a geographic location. In other words, the profile is used to convert the computing device into a device with a dedicated function, such as a music player or a word processor. In such embodiments, the home screen is replaced with the user interface for the dedicated application.

In some embodiments, a profile folder can contain files or data structures normally associated with starting the computing device. Thus, one method for enabling the location based behavior of a computing device can be to use portions of the startup scripts for the device. For example, during startup the computing device can access GPS information to determine the location of the device. If the device is within a geographic area corresponding to a profile, the startup procedure can point to the files found in the corresponding location profile to provide the desktop or home screen for the device, rather than the default startup files. Similarly, the content sources to be mounted at startup can be taken from the profile, rather than from the default list for the computing device. The information in the profile is also used to identify any input/output features that should be disabled. When the device enters or leaves a geographic area, scripts similar to the startup scripts can be executed to modify the desktop, input/output features, and content sources. In some embodiments, this is accomplished by performing a reboot of the computing device. Preferably, the actions required to implement a new location profile are accomplished without rebooting the computing device.

Yet another type of information that can be included in the profile is information about individual applications or programs. For example, in addition to providing or hiding icons for easy access, access to an application can also be allowed or prevented. Control of access to an application can be independent from whether an icon for the application is visible in a particular location. Access can be allowed or prevented to an application by any convenient method. For example, a decryption key needed for accessing data to start the application can be stored in a particular location when access is allowed. Access can be prevented by changing the location or file name for the decryption key. Alternatively, one or more executables associated with the application can be moved or renamed. Other methods will be apparent to those of skill in the art.

In other embodiments, features of various applications can be modified based on geographic location. For example, an application that provides alerts or pop-up messages, such as a "new mail" indication, could have the alert feature disabled based on a profile. Another alternative is to have applications start and/or close based on crossing of a geographic boundary. Still another alternative is to activate an additional authentication application based on geographic location. For example, within the boundaries of a company worksite, a user can access a computing device by typing in a user name and password. Outside of the company site, an additional "smart card" application can be activated, so that a card must be inserted into a reader to allow access to the computer.

Use of Location Based Data

In order to use location based data for a bookmark or profile, the geographic boundaries of location need to be defined. This can be accomplished in any convenient manner. If one or more GPS coordinates are known, such points can be directly entered into a geographic boundary definition. This includes GPS coordinates received from another computing device. (For boundaries on a larger scale, latitude and longitude definitions could similarly be used, such as if a desired mode of operation was desirable within an entire city.) Another way to enter GPS coordinates is by moving a computing device to a desired location and obtaining the GPS information using the GPS component of the computing device.

Based on one or more GPS coordinates, a geographic area can be defined. One simple way to define an area is to select a single GPS coordinate, and then define a regular shape around the coordinate. While this could often be a circle defined by a radius around the single coordinate, other shapes such as squares, rectangles, triangles, etc. could be centered or otherwise positioned in some manner relative to the known coordinate. Or a pair of GPS coordinates could be used to define a major and minor loci for an ellipse. Note that the geographic area definition does not have to be limited to a 2-dimensional world. In some cities, high-rise buildings are an important feature of the landscape. Thus, the "geographic area" definition can also include a height coordinate. Similarly, crossing a "geographic boundary" can include crossing the boundary at an appropriate height. Strictly speaking, the inclusion of a height component should result in the definition of a geographic volume. However, for convenience of description, the more conventionally used term "geographic area" will be used below, with the understanding that height coordinates can be included as desired.

Another option for defining a geographic boundary is to define a series of lines and/or arcs to provide a continuous boundary around one or more GPS coordinates. The lines and/or arcs can be specified relative to the GPS coordinates, such as by defining the distance of each endpoint of the line from a GPS coordinate, along with a radius of curvature. Still another option would be to sample a series of GPS coordinates to around a perimeter. The user could then enter connectivity data to indicate which coordinates should be considered as nearest neighbors. Straight line or other connecting arc boundaries could then be calculated between each nearest neighbor point. Optionally, any convenient combination of the above techniques could also be used.

Depending on the method used to define the bookmark or profile, the device can use GPS data to determine whether the device is inside or outside a bounded area. For example, if a location is defined as a central point and a radius, the device can compare the current GPS location of the device with the location of the central point and calculate a distance. If the distance is less than the radius, then the GPS device is within the bounded area. In another example, the boundary can be defined by specifying a series of boundary points. This type of definition could be useful for defining an irregular shape. The boundary points would preferably include an indication of which points are nearest neighbors, for ease in determining how to draw the boundary. Preferably a center point, or a series of interior points, could also be specified. In such an embodiment, the nearest boundary points to the current GPS position could be identified, along with one or more nearby interior points. The computing device could then determine if the device was on the same side of the boundary as at least one of the interior points.

In order to determine when a boundary has been crossed, the computing device can check for GPS coordinate data on a periodic basis, such as once per second, once per five seconds, once per minute, once per millisecond, or another interval that is convenient for a specific device. The GPS data is then compared with some or all of the stored bookmarks to determine if a boundary has been crossed. Note that not all bookmarks and profiles will necessarily be checked at each interval. For example, all bookmarks and profiles could be checked when the computing device is turned on. After the initial check, only bookmarks and profiles in the local vicinity of the computer would be checked on a routine basis. Other bookmarks and profiles could be checked on a longer time interval, such as once a minute or once an hour, to verify when the device is starting to approach the more distant locations.

Because the location profiles will potentially be used to alter the behavior of the device, the GPS coordinate data and associated detection of boundary crossings should be incorporated into the operating system of the device at a deep level. Depending on the embodiment, the location of the device can trigger the enabling or disabling of an input/output feature; the mounting or dismounting of a local drive or partition; the display of a different desktop or home screen; or other actions.

In order to accomplish these types of functions, preferably the operating system will have access to GPS information at a fundamental level. More generally, preferred computing devices will have the following characteristics. The computing device will have the necessary components to determine a GPS location for the device. The computing device will support location bookmarks as described above. The operating system for the device will be able to access GPS information during startup, so that the device can initially be configured according to a location profile corresponding to the current location. The operating system will further have the ability to enable or disable devices based on location; mount or dismount content sources based on location; and select a desktop or home screen based on location. The desktop or home screen for the computing device will also be configurable, so that different desktops or home screens can be selected based on a detected location. Preferably, the computing device will also have the ability to distinguish between location based profiles initiated at various security or authorization levels. For example, the computing device can access one group of location based profiles at a system administrator level of authorization, while a second group of location based profiles is accessed at a user level of authorization.

In some alternative embodiments, other sources of location information can be used, either alone or in conjunction with GPS information. In particular, in some embodiments it may be desirable to have finer location resolution than is available with GPS alone. In such embodiments, other methods of detecting a location can be used. Other potential sources of location information include, but are not limited to, other forms of satellite based location information, location information based on use of cell phone towers (such as cell phone tower triangulation), wi-fi based location detection, or inertial sensor based location detection. The geographic boundary for such other forms of location information can then be defined in a manner appropriate to the type of location information. For example, the presence of the computing device in a localized area could be determined by detecting a line-of-sight signal from a nearby signal source. In this example, the geographic boundary definition anywhere that the line-of-sight signal from the signal source can be detected. Another option would be to use the boundaries of a local wireless or wi-fi device, such as a wireless router, as a "geographic" boundary for the computing device. For example, a home user could have a wireless router set up, to allow roaming use of a network in and near the user's home. The "home" profile for a computing device could then be defined in two ways. First, a geographic area could be defined as described above based on, for example, GPS coordinates. An alternative area could then be defined as any location where the user's home wireless router is detected by the computing device. The computing device can then select the home profile based on either determining that the device is within the geographic boundary by GPS, or that the device is within the boundary defined by the range of the wireless router.

Authorization Levels for Profiles

In some preferred embodiments, location profiles can be used to allow a controlling party to implement restrictions on a computing device based on the geographic location of the device. For example, corporations often issue computing devices to employees, such as laptop computers or cell phones. A location profile implemented at a system administrator authorization level can be used to define the allowed operations for a device in any given location. The employee receiving a device could also provide location based profiles at a user authorization level to further refine the behavior of the device within the parameters established by the higher authorization level profile.

For example, a company issuing a laptop computer to an employee could use a superuser or administrator level account to set up several location based profiles on the laptop. The profiles could include one that defines the geographic area for the primary corporate work site, one that defines the geographic area for a secondary work site, one for a client site that will be routinely visited by the employee, and a default profile when outside of those geographic areas. In the profiles for the primary and secondary work sites, the boundaries for the location are defined by a series of lines and arcs that correspond to the property lines for the sites. At the client site, a central point is defined along with a radius large enough to include the full client work site.

With regard to the content of the profiles, at the primary work site, a desktop is provided with the applications needed for the employee's work. The company encourages the use of most input/output features, so the camera and microphone features are enabled, as well as all other input and output components or features on the laptop. All content sources are also mounted (or otherwise accessible) and available for use. The secondary work site profile is somewhat different. The secondary work site is primarily a customer service site, so non-employees may often have the ability to see the display of the laptop. As a result, a local drive partition for storing of confidential data is unmounted (or otherwise not accessible) at the secondary work site. A drive partition related to information for the client that is routinely visited is also unmounted. The desktop also displays several applications primarily of interest when dealing with customers. In the profile related to the client site, the camera and microphone features are disabled, based on an agreement between the company and the client. The local drive partition for storing confidential data is unmounted, but all other partitions are mounted, including the partition containing the client data. Finally, for the default profile, the drive partitions for confidential data and the frequent client are unmounted, while the desktop displays a set of applications to allow working in a public location. All input/output features are available in the default profile.

After receiving the laptop, the employee finds out from co-workers that the secondary work site has previously had problems with excessive noise. The co-workers request that he set up his computer to not make sounds while at the secondary work site. The employee creates a user authorization level location profile that disables the speaker component for the laptop. The employee copies the geographic boundary description from the system level profile for the secondary work site and applies the boundary description to the employee's location profile. Because the employee is creating a user authorization level location profile, the employee can override the selection and allow use of the speaker if needed.

However, the employee cannot gain access to the confidential data disk partition or the client disk partition, as those were designated as not accessible at a higher authorization level.

Potential Examples of Operation

The following examples are meant to demonstrate potential ways of implementing the invention, and are not intended to be limiting on how various features of a computing device may be enabled or disabled using location profiles.

EXAMPLE 1

Movement of Handheld Device from Work to Gym

An employee has received a handheld computing device from the employer. The device includes capabilities for sending and receiving e-mails, viewing attachments in a word processing program, making and receiving phone calls, and playing various types of audio files, such as MP3 files. The input and output features for the device include a touch screen display, a keypad including standard typewriter keys, a digital camera, a microphone, and at least one speaker. In this embodiment, the "phone" feature of the handheld device is also defined as an input/output feature, so that a user may easily disable the phone function when desired. The device includes at least two content sources. One content source is a drive partition that contains all of the typical applications needed for device operation. The second content source is a drive partition intended for storage of audio files.

The device includes at least two profiles. The first profile is a work profile provided by the employer. This profile has geographic boundaries that define the entire work site except for an area around the gym facility at the work site. This profile disables the camera. The disk partition for music storage is also unmounted or otherwise not accessible. The desktop displays the standard work applications. The second profile has geographic boundaries that include the gym facility. In order to encourage employees to work out, the company has decided to allow use of the handheld device as a music player for any employee using the gym. In the second profile, the disk partition for storing audio files is mounted. Optionally, a third profile may be used to handle situations where the device is not within any other profile. This third profile allows use of all input/output features and content sources on the handheld device. Alternatively, the operation of the device when outside of other profiles can default to specifications from within the operating system, so that a "profile" specifying this default operation is not necessary.

The employee who received the handheld device has also created a user profile corresponding to the gym area. In the profile, the employee changes the desktop so that the desktop displays only the functionality for playing audio files. The employee defined profile further disables the phone and the camera. Effectively, this profile converts the handheld device into a dedicated music player while the employee is within the boundaries of this user profile. When the employee carries the device across the geographic boundary that separates the gym location from the rest of the work site, the work desktop is replaced by the dedicated music player. When the employee finishes the workout and crosses the boundary again, the work desktop is displayed again.

EXAMPLE 2

Movement of Cell Phone from Home to Office

An employee receives a cell phone from an employer. The cell phone input/output features include a phone, a keypdad, a camera, and speakers. The phone has the capability to make and receive phone calls, send and receive text messages, and forward pictures to e-mail addresses as an attachment. The phone includes at least two content sources. One content source is a drive or memory partition that contains the majority of the applications and data for operating the phone. The second content source is a drive or memory partition that contains images acquired using the camera phone.

Due to corporate policy, camera phones are not permitted at the company work site. Thus, prior to issuing the phone, an administrator authorization level location profile is set up with a geographic boundary corresponding to the work site. The profile disables the camera. The profile also makes memory or drive partition containing the picture data inaccessible, such as by hiding or moving a file containing a decryption key that is needed for accessing the drive partition. When the user travels from home to work, the cell phone detects that a geographic boundary corresponding to the location profile has been crossed. At that point, the camera is disabled and the file that provides the decryption key for the memory area containing the picture data is hidden or moved.

EXAMPLE 3

Segregation of Multiple Types of User Data at Home

A family has a laptop computer that is used for a variety of purposes. The family desires to keep their financial records private. The family also has young children, so the family desires to prevent access to some video games on the laptop by the young children. The laptop computer has input/output features that include a video camera, speakers, a mouse pad, and a keyboard. The computer includes at least three content sources. A first physical hard drive is the primary data and application storage device. A second physical hard drive includes at least two disk partitions. One disk partition includes financial data, such as tax returns and the family budget. A second disk partition includes software for playing online interactive military simulation games. The laptop includes at least three location profiles. The first profile has a geographic boundary that includes all but one room of the house. In the first profile, the two disk partitions on the second physical hard drive are unmounted (or otherwise made inaccessible). The video camera is also disabled in the first profile. The desktop displays the typical programs used by the family, but does not show the financial software.

The second profile is a financial profile. When the financial profile is active, the wi-fi antenna for the computer is disabled, thus preventing internet access while reviewing financial records. This profile also mounts the disk partition including the family financial data. The video camera is disabled in this profile. The third profile is a gaming profile. In order to prevent the children from accessing the video games, the features necessary for playing the games are activated only in the gaming profile. Thus, the gaming profile mounts the disk partition containing the gaming applications (the financial data partition is unmounted). The gaming profile also enables the video camera, so that the user can see other participants who are connected to the same game. The wi-fi antenna is enabled as well, to allow internet access. With regard to the geographic boundaries, both profiles are intended for use in the single room in the house not covered by the primary home profile. As a default, the financial profile has a geographic boundary definition that covers the additional room not covered by the primary profile. As a default, the gaming profile does not include a geographic boundary definition. As a result, the gaming profile never becomes active simply by moving the laptop. This prevents the family children from gaining access to the military simulation games without the knowledge of the parents. When a user desires to use the gaming profile, the boundary location for the financial profile is deleted, and then that same definition is assigned to the gaming profile. When the gaming session is over, the user restores the original geographic boundary definitions for the profiles. In this example, modifying the geographic boundary definitions for the profiles is performed at an authorization level that requires a password protected login, to prevent the children from modifying the gaming profile. In this example, when a user modifies the financial and gaming profiles with new geographic boundary information, the user issues a command to force the laptop to check all profile definitions, so that the computer will realize that a new profile contains a nearby geographic definition. Alternatively, the computer could be rebooted after modifying the profile geographic boundaries.

Optionally, the above example could be implemented using a combination of GPS location detection and another form of location detection. For example, if GPS location detection was not sufficient to allow distinction between the single room and the rest of the house, another signal could be established in the single room, such as a line-of-sight infrared signal. In such an embodiment, the financial and gaming profiles would then only be available when the second, line-of-sight signal was detected by the computing device.

EXAMPLE 4

Moving Laptop Computer from Home to Office and within the Office

An employee receives a laptop computer from the employer. The laptop input/output features include a keyboard, speakers, a video camera, a wi-fi antenna, and a mousepad. The laptop includes at least two content sources. One content source is a disk partition containing the general data and applications for the laptop. A second disk partition contains proprietary information. The laptop includes multiple work-related location profiles. The geographic boundaries for each work profile correspond to radius around a central point. A location profile is included for each work site owned by the company. Each work location profile includes mounting of the proprietary information disk partition. The work profiles also disables the video camera. One additional profile is included that corresponds to any location outside of the work profiles. In the additional profile, the proprietary information disk partition is unmounted (or otherwise made inaccessible). To prevent unauthorized access of the computer, the wi-fi antenna is also disabled outside of the locations corresponding to the work profiles. Optionally, if a geographic boundary corresponding to a work site location profile is crossed while the laptop is on, the laptop may automatically shut down.

The laptop also contains a number of location bookmarks. A location bookmark is included for each conference room at the various work sites. Each location bookmark is geographically defined as a radius around a central point, with the central points corresponding to the various conference rooms. According to company policy, prior to a meeting in a conference room, the meeting leader must give safety instructions that include the evacuation route from the conference room and the evacuation assembly point. When a laptop is moved within a location bookmark, a safety folder is made available on the desktop that includes the safety instructions for the corresponding conference room.

In a further extension, the laptop could also include location profiles corresponding to the work site of a third party, such as a competitor that is part of a collaborative project. Due to low levels of trust for the third party, any content source including proprietary information can be made unavailable within the third party work site. Additionally, an application can be started that logs key strokes on the computer while at the third party work site, in order to identify any attempts to make inappropriate use of the computing device.

Having briefly described an overview of various embodiments of the invention, an exemplary operating environment suitable for performing the invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, GPS component 126, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EE-PROM), flash memory or other memory technology, CD-ROM, digital versatile disks (DVD) or other holographic memory, magnetic cassettes, magnetic tape, magnetic disk storage or other magnetic storage devices, carrier wave, or any other medium that can be used to encode desired information and which can be accessed by the computing device 100. In another embodiment, computer storage media can be any tangible computer readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, etc. GPS component 126 is an example of an I/O component, but is shown separately here for convenience. Note that GPS component 126 is one example of a location sensing component.

Figure 2:
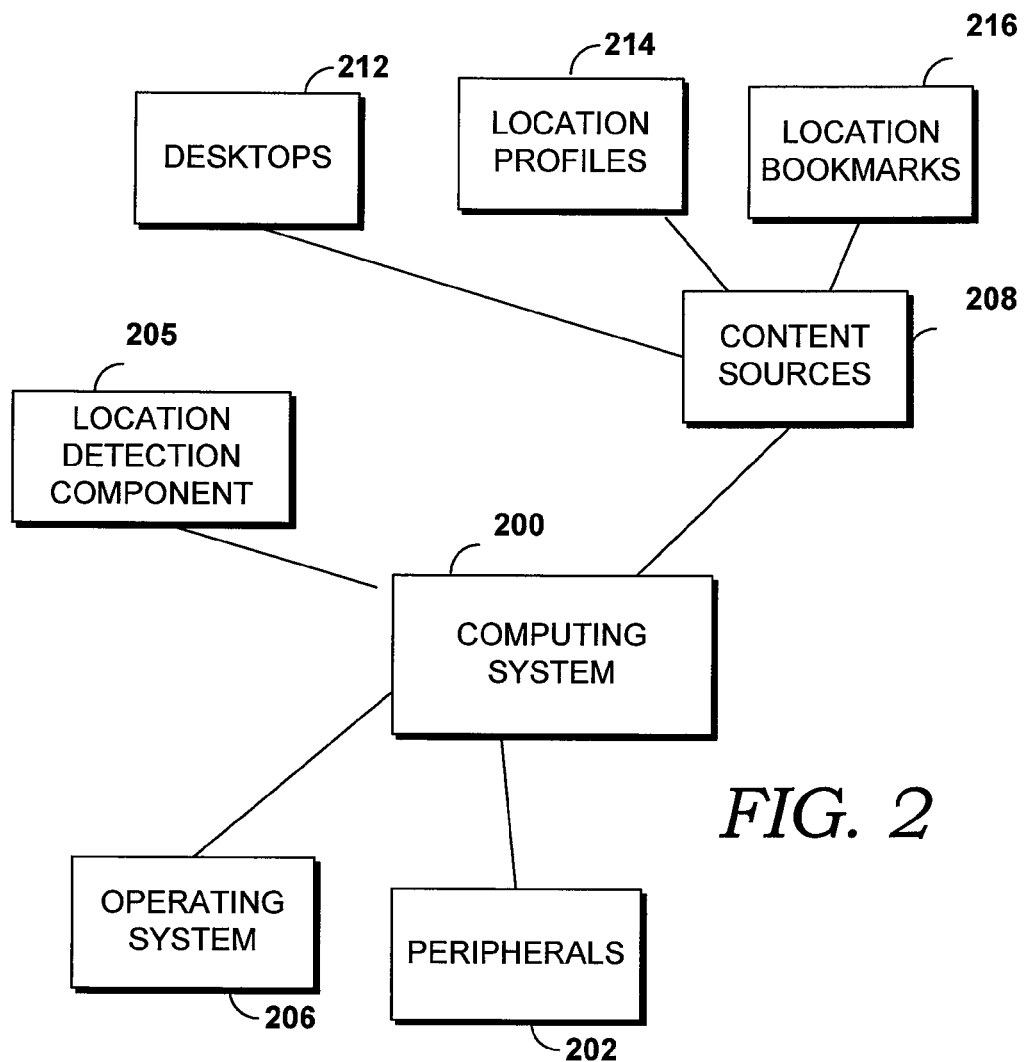
FIG. 2 schematically shows an example of a computing device suitable for performing embodiments of the invention.

Embodiments of the present invention relate to systems and methods for sharing search history information between searchers to facilitate collaboration. Turning now to FIG. 2, a block diagram is illustrated, in accordance with an embodiment of the present invention, showing an exemplary computing system 200 suitable for using location based profiles and/or bookmarks. It will be understood and appreciated by those of ordinary skill in the art that the computing system 200 shown in FIG. 2 is merely an example of one suitable computing system environment and is not intended to suggest any limitation as to the scope of use or functionality of embodiments of the present invention. Neither should the computing system 200 be interpreted as having any dependency or requirement related to any single component or combination of components illustrated therein. Further, the computing system 200 may be provided as a stand-alone product, as part of a software development environment, or any combination thereof.

The computing system 200 includes an operating system 206, a GPS component 205, one or more input/output features 202, and one or more content sources 208, all in communication with one another. Optionally, one or more components of computing system 200 may be in communication with one another via a network, as opposed to co-location in a single device. Also shown are several items stored in one or more of content sources 208, including one or more desktops 212, one or more location profiles 214, and one or more location bookmarks 216.

The computing system 200 shown in FIG. 2 may be any type of computing device. By way of example only and not limitation, the computing system 200 may be a personal computer, desktop computer, laptop computer, handheld device, mobile handset, consumer electronic device, and the like. Additionally, the computing device may further include a keyboard, keypad, stylus, joystick, and any other input-initiating component. It should be noted, however, that the present invention is not limited to implementation on such computing devices, but may be implemented on any of a variety of different types of computing devices within the scope of embodiments hereof.

The computing system 200 is configured to detect location information using location detection component 205. A GPS component is an example of a location detection component, although other components could be used, such as the wi-fi antenna of a computing device. The location information is compared with the geographic locations specified in location profiles 214 and/or location bookmarks 216. If the location matches the geographic location specified in one or more profiles, the configuration of the computing system is modified by changing the status of a content source 208, enabling or disabling input/output features 202, and/or modifying the displayed desktop or home screen based on stored desktop information 212. When a geographic boundary for a location bookmark 216 is crossed, the bookmark can also be displayed on the desktop and/or the user can be notified, such as by sound, that the current location is now within the geographic boundaries of the bookmark.

Figure 3:
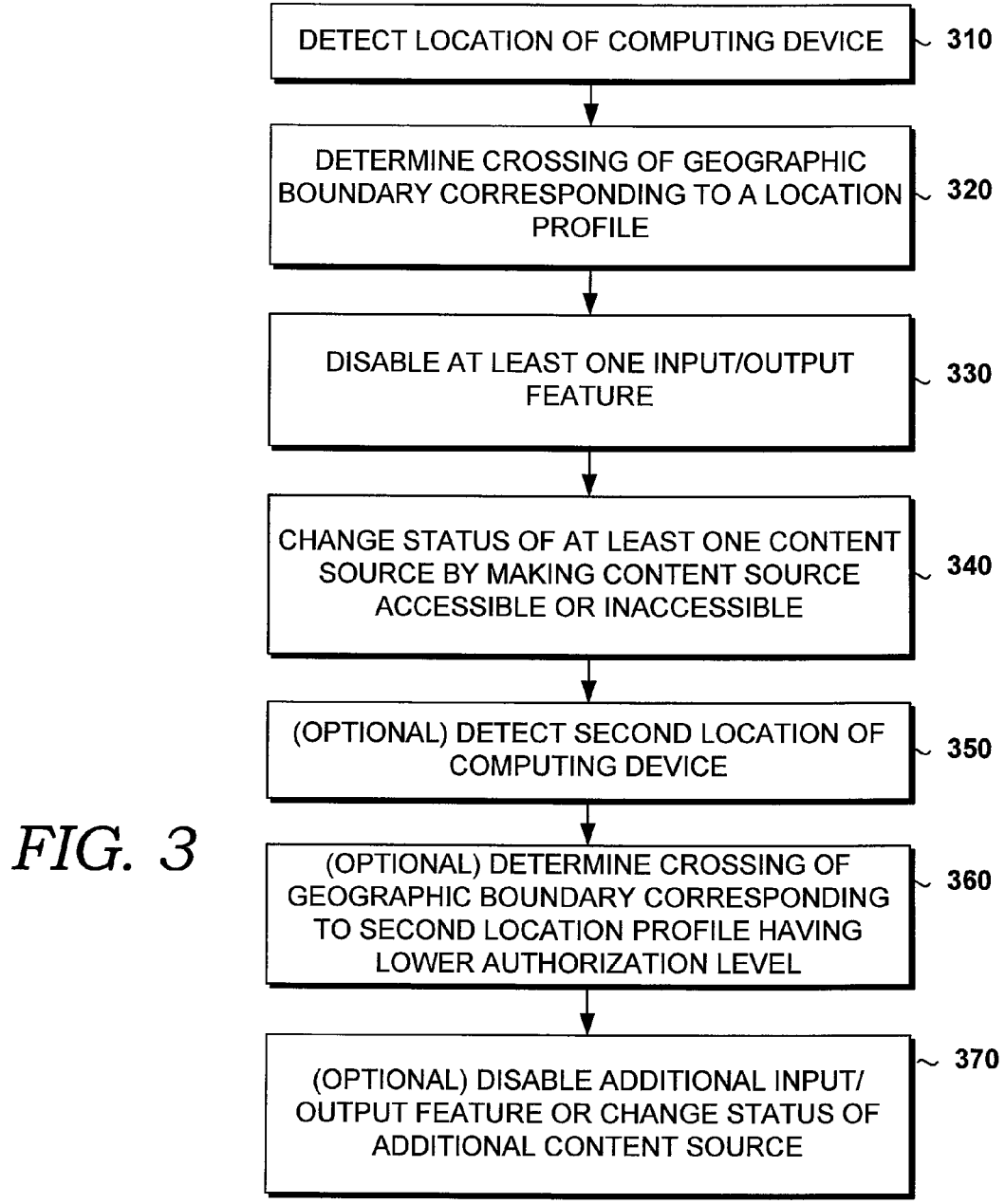
FIG. 3 depicts a flow chart of a method according to an embodiment of the invention.

FIG. 3 depicts a flow chart showing a method according to an embodiment of the invention. In FIG. 3, the location of a computing device is detected 310, such as by determining the GPS coordinates of the device using an internal GPS component. The location information is then used to determine 320 whether the computing device has crossed a geographic boundary from a location profile stored on the device. When a geographic boundary is crossed, at least one input/output feature is disabled 330. The status of at least one content source is changed 340 by making the content source accessible or inaccessible in response to crossing the geographic boundary.

Optionally, a method according to the embodiment shown in FIG. 3 can further include detecting 350 a second location of the computing device. Based on the second detected location, it can optionally be determined that a geographic boundary has been crossed corresponding to a second location profile. The second location profile has a lower authorization level than the first location profile. Optionally, another input/output feature can be enabled/disabled or the status of another content source can be changed (such as mounted/unmounted) in response to crossing of the second geographic boundary.

Figure 4:
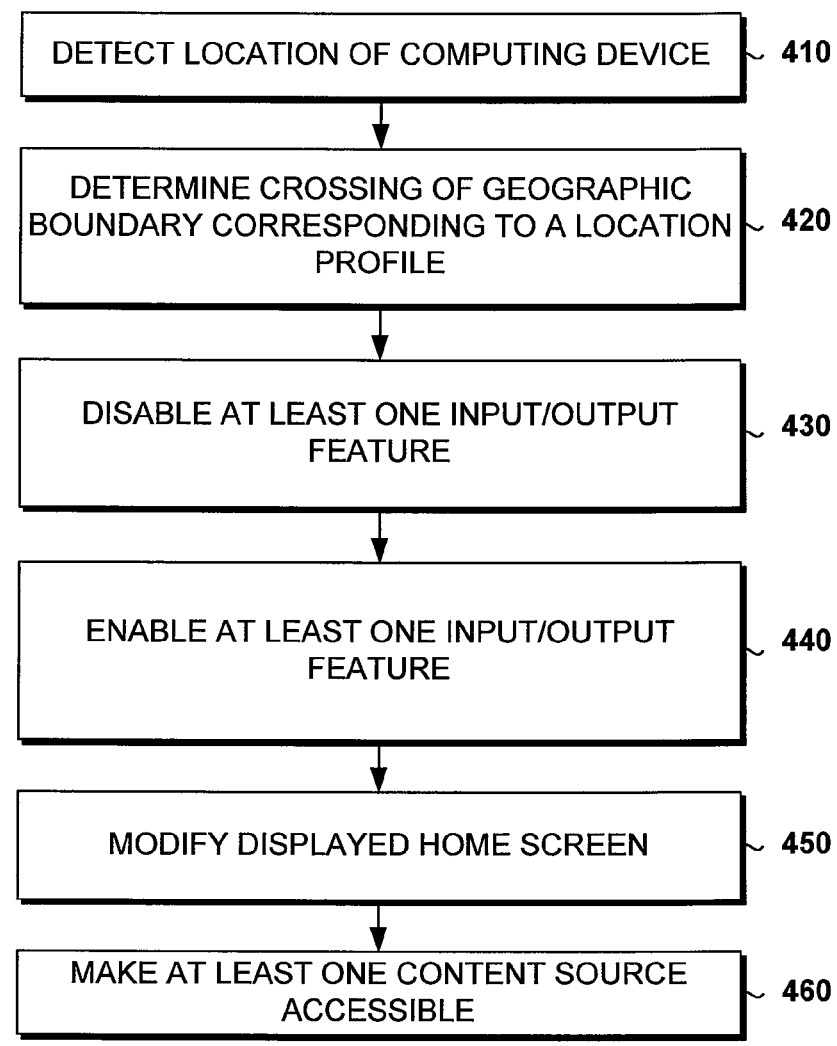
FIG. 4 depicts a flow chart of a method according to an embodiment of the invention.

FIG. 4 depicts a flow chart showing a method according to another embodiment of the invention. In FIG. 4, the location of a computing device is detected 410. The location information is used to determine 420 whether the computing device has crossed a geographic boundary from a location profile stored on the device. When a geographic boundary is crossed, at least one input/output feature is disabled 430, while another at least one input/output feature is enabled 440. The home screen of the device is also modified 450, and at least one content source is made accessible 460 in response to crossing the geographic boundary.

Figure 5:
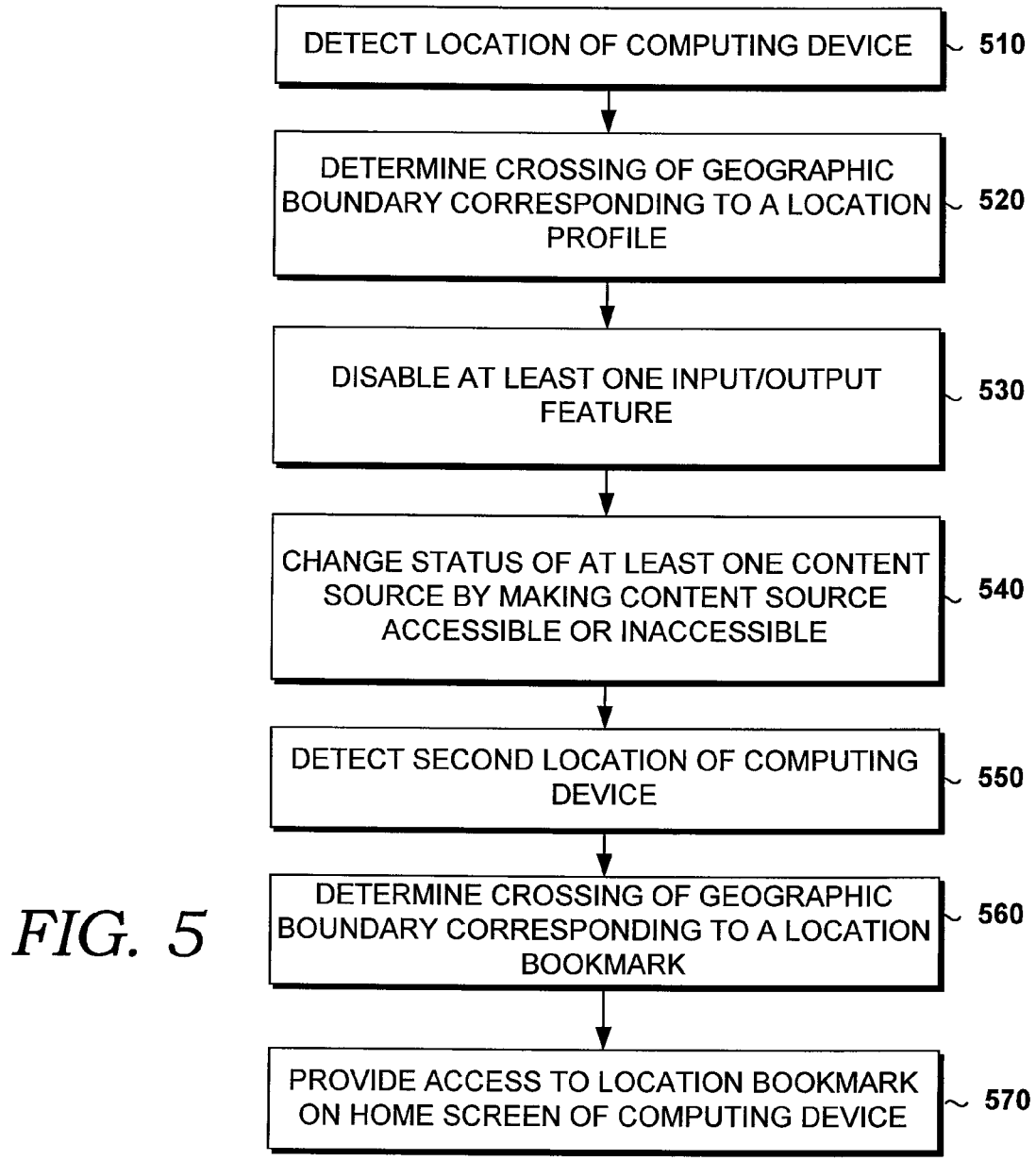
FIG. 5 depicts a flow chart of a method according to an embodiment of the invention.

FIG. 5 depicts a flow chart showing a method according to yet another embodiment of the invention. In FIG. 5, the location of a computing device is detected 510. The location information is used to determine 520 whether the computing device has crossed a geographic boundary from a location profile stored on the device. When a geographic boundary is crossed, at least one input/output feature is disabled 530. The status of at least one content source is changed 540 by making the content source accessible or inaccessible in response to crossing the geographic boundary. A second location for the computing device is then detected 550, based on further movement of the device. After determining 560 that the device has crossed a second geographic boundary corresponding to a location bookmark, the location bookmark is provided 570 on the home screen of the device.

ADDITIONAL EMBODIMENTS

In an embodiment, one or more computer-storage media are provided that store computer-useable instructions that, when executed by a computing device, perform a method for modifying the configuration of a computing device based on a location profile. The stored method includes detecting a location for a computing device. Based on the detected location, it is then determined that the computing device has crossed a first geographic boundary corresponding to a first location profile. At least one input/output feature of the computing device is disabled in response to crossing the first geographic boundary. The status of at least one content source is also changed by making the at least one content source accessible or inaccessible in response to crossing the first geographic boundary.

In an optional extension of this type of embodiment, a second location can be detected for the computing device. Based on the second detected location, it is determined that the computing device has crossed a second geographic boundary corresponding to a second location profile. The first location profile has a higher authorization level than the second location profile. In response to crossing the second geographic boundary, at least one input/output feature of the computing device is disabled. Alternatively, the status of at least one content source can be changed.

In another embodiment, a computer-based method for modifying the configuration of a computing device is provided. The method includes detecting a location for a computing device. Based on the detected location, it is determined that the computing device has crossed a first geographic boundary corresponding to a first location profile. At least one input/output feature of the computing device is disabled in response to crossing the first geographic boundary. At least one different input/output feature of the computing device is also enabled in response to crossing the first geographic boundary. The displayed home screen is modified in response to crossing the first geographic boundary. The status of at least one content source is modified in response to crossing the first geographic boundary, such as by making the content source accessible.

In still another embodiment, a computer-based method for modifying the configuration of a computing device is provided. The method includes detecting a first location for a computing device. Based on the detected location, it is determined that the computing device has crossed a first geographic boundary corresponding to a location profile. At least one input/output feature of the computing device is disabled in response to crossing the first geographic boundary. The status of at least one content source is also changed by making the at least one content source accessible or inaccessible in response to crossing the first geographic boundary. A second location for the computing device different from the first location is then detected. It is determined that the computing device has crossed a second geographic boundary corresponding to a location bookmark. Access to the location bookmark is provided on the home screen of the device in response to crossing the second geographic boundary Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. One or more computer-storage media storing computer-useable instructions that, when executed by a computing device, perform a method for modifying the configuration of a computing device based on a location profile, the method comprising:

detecting a location for a computing device;

receiving a location bookmark from a central server prior to detecting the location for the computing device;

determining, based on the detected location, that the computing device has crossed a first geographic boundary corresponding to a first location profile;

disabling at least one input/output feature of the computing device in response to crossing the first geographic boundary; and changing the status of at least one content source by making the at least one content source accessible or inaccessible in response to crossing the first geographic boundary.

2. The computer storage media storing computer-useable instructions that, when executed by a computing device, perform a method according to claim 1, wherein the input/output feature is an input/output component.

3. The computer storage media storing computer-useable instructions that, when executed by a computing device, perform a method according to claim 1, wherein the at least one content source comprises a disk partition, and changing the status of the content source comprises mounting or unmounting the disk partition.

4. The computer storage media storing computer-useable instructions that, when executed by a computing device, perform a method according to claim 1, further comprising modifying a displayed home screen in response to crossing the first geographic boundary.

5. The computer storage media storing computer-useable instructions that, when executed by a computing device, perform a method according to claim 4, wherein modifying the displayed home screen comprises replacing the home screen with the user interface for an application.

6. The computer storage media storing computer-useable instructions that, when executed by a computing device, perform a method according to claim 1, further comprising:

detecting a second location for the computing device;

determining that the computing device has crossed a second geographic boundary corresponding to a second location profile, the second location profile having a different authorization level than the first location profile; and disabling at least one additional input/output feature of the computing device in response to crossing the second geographic boundary.

7. The computer storage media storing computer-useable instructions that, when executed by a computing device, perform a method according to claim 1, further comprising:
  detecting a second location for the computing device;
  determining that the computing device has crossed a second geographic boundary corresponding to a second location profile, the second location profile having a different authorization level than the first location profile; and
  changing the status of at least one content source in response to crossing the second geographic boundary.

8. The computer storage media storing computer-useable instructions that, when executed by a computing device, perform a method according to claim 1, wherein the at least one input/output feature is disabled and the status of the at least one content source is changed without rebooting the computing device.

9. The computer storage media storing computer-useable instructions that, when executed by a computing device, perform a method according to claim 1, further comprising providing a notification that a bookmark corresponding to the detected location is available.

10. The computer storage media storing computer-useable instructions that, when executed by a computing device, perform a method according to claim 1, further comprising providing access to the location bookmark on a desktop or home screen of the device in response to crossing the first geographic boundary.

11. A computer-based method for modifying the configuration of a computing device, comprising:
  detecting a location for a computing device;
  determining, based on the detected location, that the computing device has crossed a first geographic boundary corresponding to a first location profile;
  disabling at least one input/output feature of the computing device in response to crossing the first geographic boundary;
  enabling at least one input/output feature of the computing device different from the disabled feature in response to crossing the first geographic boundary;
  modifying the displayed home screen in response to crossing the first geographic boundary;
  making at least one content source accessible in response to crossing the first geographic boundary; and
  providing access to a location bookmark on the modified home screen of the device in response to crossing the first geographic boundary.

12. The computer-based method of claim 11, wherein modifying the displayed home screen comprises replacing the home screen with the user interface for an application.

13. The computer-based method of claim 11, further comprising:
  detecting a second location for the computing device;
  determining that the computing device has crossed a second geographic boundary corresponding to a second location profile, the second location profile having a different authorization level than the first location profile; and
  disabling at least one additional input/output feature of the computing device in response to crossing the second geographic boundary.

14. The computer-based method of claim 13, wherein the at least one additional input/output feature disabled in response to crossing the second geographic boundary is different from the at least one input/output feature enabled in response to crossing the first geographic boundary.

15. A computer-based method for modifying the configuration of a computing device, comprising:
  detecting a first location for a computing device;
  determining, based on the detected location, that the computing device has crossed a first geographic boundary corresponding to a location profile;
  disabling at least one input/output feature of the computing device in response to crossing the first geographic boundary;
  changing the status of at least one content source by making the at least one content source accessible or inaccessible in response to crossing the first geographic boundary;
  detecting a second location for the computing device different from the first location;
  determining that the computing device has crossed a second geographic boundary corresponding to a location bookmark; and
  providing access to the location bookmark on the home screen of the device in response to crossing the second geographic boundary.

16. The computer-based method of claim 15, wherein the second geographic boundary is different from the first geographic boundary.

17. The computer-based method of claim 15, wherein providing access to the location bookmark comprises displaying a link to the location bookmark on the home screen.

18. The computer-based method of claim 15, further comprising providing a notification that a bookmark corresponding to the second location is available.

19. The computer-based method of claim 15, further comprising:
  detecting a third location for the computing device;
  determining that the computing device has crossed a third geographic boundary corresponding to a second location profile, the second location profile having a different security level than the first location profile; and
  disabling at least one additional input/output feature of the computing device in response to crossing the third geographic boundary.

20. The computer-based method of claim 15, wherein the home screen of the device comprises a desktop for the device.

* * * * *